United States Patent [19]

Tang

[11] Patent Number: 4,775,575

[45] Date of Patent: Oct. 4, 1988

[54] INSULATIVE TEXTILE FABRIC

[76] Inventor: Thomas L. C. Tang, 7 Ridge La., Lincoln, Mass. 01772

[21] Appl. No.: 83,478

[22] Filed: Aug. 10, 1987

Related U.S. Application Data

[63] Continuation-in-part of Ser. No. 897,655, Aug. 18, 1986, abandoned.

[51] Int. Cl.⁴ ............................................... B32B 5/02
[52] U.S. Cl. .................................. 428/212; 428/233; 428/236; 428/247; 428/248; 428/255; 428/284; 428/286; 428/287
[58] Field of Search ............... 428/212, 233, 236, 247, 428/248, 255, 284, 286, 287

[56] References Cited

U.S. PATENT DOCUMENTS 4,433,024 2/1984 Eian ...................................... 428/233

Primary Examiner—Marion C. McCamish
Attorney, Agent, or Firm—John E. Toupal; Harold G. Jarcho

[57] ABSTRACT

A flexible, layered textile fabric including a bottom layer composed of woven yarn comprising moisture absorbent fibers, the bottom layer defining an array of moisture receiving spaces; a top layer composed of woven yarn comprising both moisture-repellent and moisture absorbent fibers, the top layer defining an array of air spaces; and an intermediate layer disposed between the top and bottom layers and composed of randomly distributed fibers that define interstices and extend between the top and bottom layers, the randomly distributed fibers being made of a moisture-repellent synthetic material and exhibiting an ability to wick moisture by capillary action. The bottom layer absorbs body moisture which is wicked by the intermediate layer to the top layer for evaporation.

19 Claims, 1 Drawing Sheet

4,775,575 ic insulation value, the thickness of the intermediate layer 12 can be controlled.

INSULATIVE TEXTILE FABRIC

CROSS-REFERENCE TO RELATED APPLICATION

This application is a continuation-in-part of U.S. patent application Ser. No. 06/897,655, "Insulative Textile Fabric", filed Aug. 18, 1986, now abandoned.

BACKGROUND OF THE INVENTION

This invention relates generally to a textile fabric and, more particularly, to a layered textile fabric for use as an insulative covering such as a bedcover.

Bedcovers such as quilts and blankets are commonly used as insulative coverings to increase the comfort level of those exposed to ambient temperatures substantially below body temperature. However, such passive bed covers exhibit a fixed insulation value that can produce discomfort when not properly matched with ambient temperatures which frequently are changing. In addition, conventional bedcovers can create discomfort by failing to dissipate body perspiration produced during periods of over-heating.

Also well known are dynamic type covers such as electric blankets. Although their heat output adjusts to varying ambient temperatures, electric blankets can create user discomfort by failing to compensate for uneven body temperatures often resulting from the non-uniform thermal output of the blanket itself. The body utilizes a perspiration process to maintain body temperature at 98.6° F. However, if the body experiences uneven heat contact such as that provided by conventional electric blankets, the perspiration process is distorted in over-heated body areas. Resultant induced perspiration in specific body areas such as the feet and hands can result in uncomfortable body wetness, head coldness, and throat conditions caused by loss of moisture. Another disadvantage of dynamic bed coverings is the requirement for electrical connections.

The object of this invention, therefore, is to provide an improved body covering that alleviates the problems associated with prior insulative covers of both the passive and dynamic types.

SUMMARY OF THE INVENTION

The invention is a flexible, layered textile fabric including a bottom layer composed of woven yarn comprising moisture absorbent fibers, the bottom layer defining an array of moisture receiving spaces; a top layer composed of woven yarn comprising both moisture-repellent and moisture absorbent fibers, the top layer defining an array of air spaces; and an intermediate layer disposed between the top and bottom layers and composed of randomly distributed fibers that define interstices and extend between the top and bottom layers, the randomly distributed fibers being made of a moisture-repellent synthetic material and exhibiting an ability to wick moisture by capillary action. The bottom layer absorbs body moisture which is wicked by the intermediate layer to the top layer for evaporation. During this process, the insulative characteristics of discrete intermediate layer portions are automatically regulated in response to directly adjacent body conditions.

According to certain features of the invention, the moisture receiving spaces are substantially larger than the air spaces, and the interstices generally are larger than the air cells and smaller than the moisture receiving spaces. The larger spaces in the bottom layer facilitate air circulation that provides more uniform heat distribution.

According to yet other features of the invention, the moisture absorbent fibers are natural fibers from the group including cotton, wool, silk and ramie; and the yarn comprising the bottom layer exhibits a low range twist of between 4-7 turns per inch. The natural fibers and low range twist enhance the moisture absorption capability of the bottom layer.

According to yet another feature of the invention, the bottom layer comprises an uneven surface facing the intermediate layer and having peak portions separated by recesses substantially larger than the interstices. The peak portions engage the intermediate layer so as to provide moisture transfer therebetween and the recesses provide insulative dead air filled chambers therebetween.

According to still another feature of the invention, the top, bottom and intermediate layers are secured together by cross-stitching that separate unsecured sections of the layers, and the unsecured sections define areas of between 16-256 square inches. The stitching prevents complete separation of the layers while the unsecured sections provide maximum insulation.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 2:
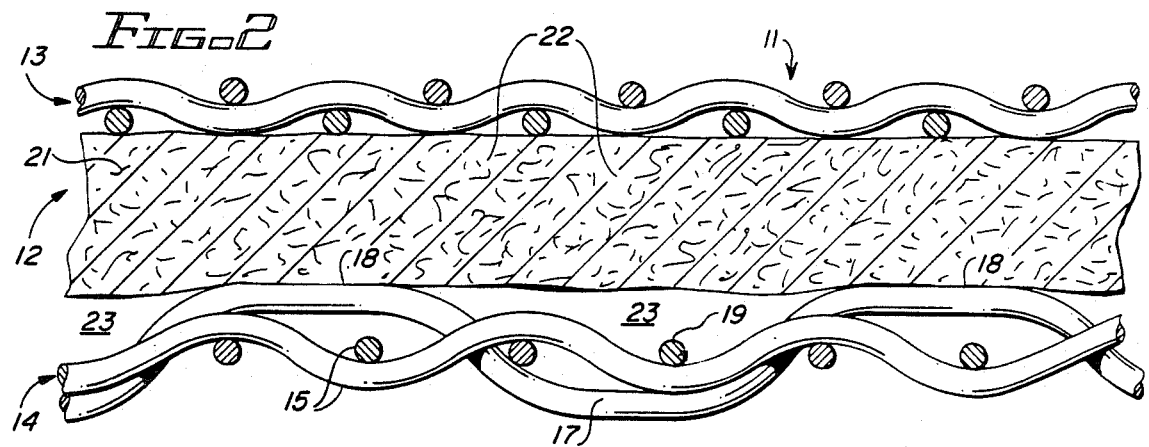
FIG. 2 is a cross-sectional view taken along lines 2—2 of FIG. 1.
Figure 3:
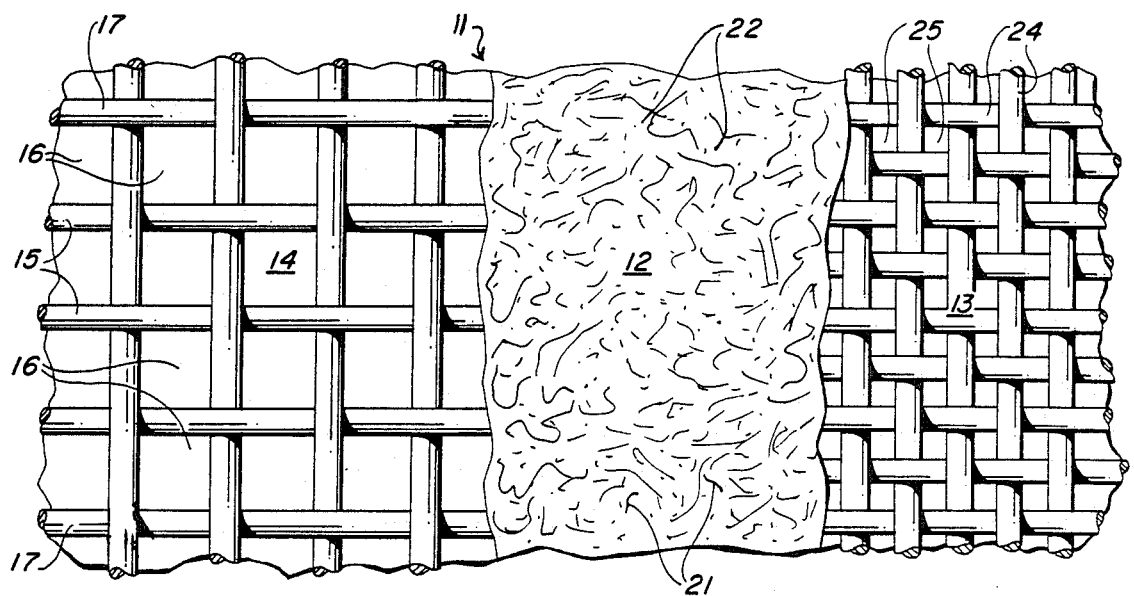
FIG. 3 is a plan view with cut-away sections to show different layers of the textile fabric shown in FIG. 1.

According to the invention shown in FIGS. 2 and 3, a textile fabric 11 includes an intermediate layer 12 straddled by a top layer 13 and a bottom layer 14. The bottom layer 14 is made of highly moisture absorbent natural fibers such as cotton, wool, silk, or ramie spun into yarn strands 15. Formed between the yarn strands 15 are moisture receiving spaces 16. Preferably, the yarn 15 is spun with a very low twist of between 4-7 turns per inch and coarsely woven with low tension looms so as to exhibit high moisture absorbtivity and to provide moisture receiving spaces 16 of substantial size. By controlling the thickness of the bottom layer 14, its capacity to absorb human perspiration can be established at a desired level. The weaving pattern of the bottom layer 14 also includes strands 17 even more coarsely woven to provide an uneven surface 17 facing the intermediate layer 12 and formed by peak portions 18 separated by recesses 19.

The intermediate layer 12 is an unwoven mat composed of randomly distributed, moisture-repellent synthetic fibers 21 such as polyester, polypropelene, acrylic, nylon or the like. Formed between the fibers 21 are interstices 22 in the fractional millimeter range and preferably smaller than the moisture receiving spaces 16 in the bottom layer 14. Because of capillary action, the fibers 21 function as wicks whereby moisture will migrate between the ends thereof. To enhance its thermal insulation properties the intermediate layer 12 preferably is not physically bonded to the top layer 13 or the bottom layer 14. Rather, the intermediate layer 12 is merely compressed between the top layer 13 and the peak portions 18 on the uneven upper surface of the bottom layer 14 so as to provide dead air filled chambers 23 in the recesses 19. The dead air filled chambers 23 further enhance the thermal insulative qualities of the intermediate layer 12.

The top layer 13 is a fabric formed by woven strands of yarn 24. Preferably, the yarn 24 is tightly woven so as to provide between the strands thereof air spaces 25 smaller than either the interstices 22 in the intermediate layer 12 or the moisture receiving spaces 16 in the bottom layer 14. The yarn 24 forming the top layer 13 preferably is formed by a blended mixture of moisture absorbtive natural fibers such as those used for the bottom layer 14 and moisture-repellent synthetic fibers such as those used for the intermediate layer 12. By suitably selecting a particular ratio or moisture absorbtive and moisture-repellent fibers, a desired moisture evaporation rate for any particular application can be established for the top layer 13.

Figure 1:
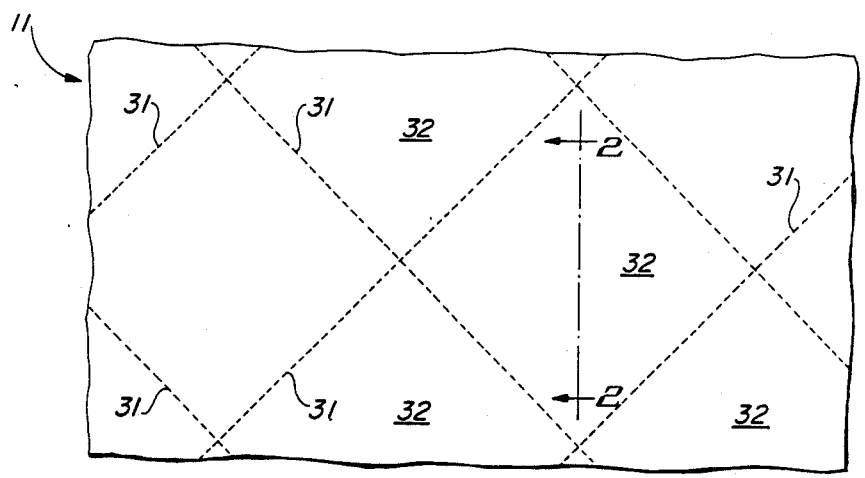
FIG. 1 is a plan view of a portion of a textile fabric according to the invention.

As illustrated in FIG. 1 the top layer 13, the intermediate layer 12 and the bottom layer 14 are secured together by cross-stitching 31. Separated by the cross-stitching 31 are unsecured sections 32 of the overall fabric 11. Preferably, the unsecured sections 32 define areas in a range between 16-256 square inches so as to prevent complete separation of the upper intermediate and lower layers 13, 12 and 14 without substantially reducing the thermal insulative qualities of the composite fabric 11.

The operation of the textile fabric 11 will be described in connection with a preferred use as a bedcover. During periods when a covered body requires heat retention, it will remain dry and the loss of body heat generated by normal caloric converted kinetic energy is minimized by the insulative properties of the intermediate layer 12. However, when certain portions of the covered body over-heat due to excessive caloric conversion that occurs, for example, in deep sleep, the body's heat regulation system begins to produce in those portions perspiration. That uncomfortable condition is quickly alleviated by the bottom layer 14, the fibers 15 of which absorb the generated perspiration. When the absorbed moisture reaches the intermediate layer 12, capillary action allows the fibers 21 to wick the moisture from the bottom layer 14 to the top layer 13 thereby bypassing in that particular portion of the intermediate layer 12 the insulative function of the interstices 22. When the wicked moisture reaches and is absorbed into the top layer 12, convection air currents above the top surface thereof quickly change the surface temperature and shift the isotherm condition within the thickness of the fabric 11. By this action, the area above any over-heated and perspiring portion of the body undergoes a temperature regulation effect that causes cooling and reduction of perspiration.

Thus, the fabric 11 provides a passive, selective temperature regulation that responds to the moisture condition at each portion of a covered body. Because of the delayed regulative function provided by the fabric 11, the covered body will see tempered thermal changes that enhance the comfort quotient. Additional thermal regulation is provided by the large moisture spaces 16 in the bottom layer 14. In response to over-heating a body instinctively responds with movement. The air flow produced by such body movement is accommodated by the large spaces 16 in the bottom layer 14 to quickly distribute the heat from the over-heated area. This distribution does not, however, reduce the thermal insulative value of the intermediate layer 12 so that the composite fabric 11 retains its ability to minimize the composite loss of body generated heat. Thus, the thermal characteristics of individual sections of the fabric 11 are automatically varied in response to a body surface condition adjacent thereto and in that way produces uniform temperature distribution in the region between the fabric 11 and the covered body.

Obviously, many modifications and variations of the present invention are possible in light of the above teachings. For example, although described for use in a preferred form as a bedcovering, it will be obvious that the fabric 11 could be used also for more comfortable apparel that uniformly distributes body temperature. It is to be understood, therefore, that the invention can be practiced otherwise than as specifically described.

What is claimed:
1. A flexible, layered textile fabric comprising:
   a bottom layer composed of woven yarn comprising moisture absorbent fibers, said bottom layer defining an array of moisture receiving spaces;
   a top layer composed of woven yarn defining an array of air spaces substantially smaller than said moisture receiving spaces, and
   an intermediate layer disposed between said top and bottom layers and composed of randomly distributed fibers that define interstices and extend between said top and bottom layers, said randomly distributed fibers being made of a moisture-repellant synthetic material and exhibiting an ability to wick moisture by capillary action.
2. A textile fabric according to claim 1 wherein said interstices generally are larger than said air spaces and smaller than said moisture receiving spaces and said top layer comprises both moisture repellant and moisture absorbent fibers.
3. A textile fabric according to claim 3 wherein said moisture absorbent fibers are natural fibers from the group including cotton, wool, silk and ramie.
4. A textile fabric according to claim 3 wherein said yarn comprising said bottom layer exhitbits a low range twist of between 4-7 turns per inch.
5. A textile fabric according to claim 4 wherein said moisture absorbent fibers are natural fibers from the group including cotton, wool, silk and ramie.
6. A textile fabric according to claim 5 wherein said moisture-repellent synthetic material is from a group including polyester, polypropylene, acrylic and nylon.
7. A textile fabric according to claim 1 wherein said bottom layer comprises an uneven surface facing said intermediate layer and having peak portions separated by recesses substantially larger than said interstices, said peak portions engaging said intermediate layer so as to provide moisture transfer therebetween and said recesses providing dead air filled chambers therebetween.
8. A textile fabric according to claim 7 wherein said moisture receiving spaces are substantially larger than said air spaces.
9. A textile fabric according to claim 8 wherein said interstices generally are larger than said air spaces and smaller than said moisture receiving spaces.
10. A textile fabric according to claim 9 wherein said moisture absorbent fibers are natural fibers from the group including cotton, wool, silk and ramie.

11. A textile fabric according to claim 9 wherein said yarn comprising said bottom layer exhibits a low range twist of between 4–7 turns per inch.

12. A textile fabric according to claim 11 wherein said moisture absorbent fibers are natural fibers from the group including cotton, wool, silk and ramie.

13. A textile fabric according to claim 12 wherein said moisture absorbent fibers are natural fibers from the group including cotton, wool, silk and ramie.

14. A textile fabric according to claim 1 wherein said top, bottom and intermediate layers are secured together by cross-stitching that separates unsecured sections of said layers, and said unsecured sections define areas of between 16–256 square inches.

15. A textile fabric according to claim 14 wherein said moisture receiving spaces are substantially larger than said air spaces.

16. A textile fabric according to claim 15 wherein said interstices generally are larger than said air spaces and smaller than said moisture receiving spaces.

17. A textile fabric according to claim 14 wherein said bottom layer comprises an uneven surface facing said intermediate layer and having peak portions separated by recesses substantially larger than said interstices, said peak portions engaging said intermediate layer so as to provide moisture transfer therebetween and said recesses providing dead air filled chambers therebetween.

18. A textile fabric according to claim 17 wherein said moisture receiving spaces are substantially larger than said air spaces.

19. A textile fabric according to claim 18 wherein said interstices generally are larger than air spaces and smaller than said moisture receiving spaces.

* * * * *